United States Patent
Jones et al.

(10) Patent No.: US 7,548,980 B2
(45) Date of Patent: Jun. 16, 2009

(54) ENHANCED NETWORK MANAGEMENT SYSTEM

(75) Inventors: Kenneth Roger Jones, Cool, CA (US); Brian A. Gonsalves, Antioch, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 924 days.

(21) Appl. No.: 10/654,858

(22) Filed: Sep. 4, 2003

(65) Prior Publication Data

US 2005/0055431 A1    Mar. 10, 2005

(51) Int. Cl.
G06F 15/16    (2006.01)
(52) U.S. Cl. .................. 709/227; 709/203; 709/223; 709/224; 709/228; 714/47; 714/48
(58) Field of Classification Search ................. 709/223, 709/224, 233, 236, 244, 249, 203, 227, 228; 714/47, 48
See application file for complete search history.

(56) References Cited

U.S. PATENT DOCUMENTS

| | | | |
|---|---|---|---|
| 5,469,353 A | 11/1995 | Pinsky et al. | |
| 5,896,383 A | 4/1999 | Wakeland | |
| 5,970,069 A | 10/1999 | Kumar et al. | |
| 6,047,002 A | 4/2000 | Hartmann et al. | |
| 6,271,845 B1* | 8/2001 | Richardson | 715/764 |
| 6,272,127 B1 | 8/2001 | Golden et al. | |
| 6,351,452 B1* | 2/2002 | Koenig et al. | 370/217 |
| 6,370,152 B1 | 4/2002 | Schofield et al. | |
| 6,389,464 B1 | 5/2002 | Krishnamurthy et al. | |
| 6,421,319 B1* | 7/2002 | Iwasaki | 370/230 |
| 6,430,273 B1* | 8/2002 | Shaheen | 379/93.14 |
| 6,430,619 B1* | 8/2002 | Sitaraman et al. | 709/225 |
| 6,445,682 B1 | 9/2002 | Weitz | |
| 6,452,923 B1 | 9/2002 | Gerszberg et al. | |
| 6,453,016 B1* | 9/2002 | Chea, Jr. | 379/29.01 |
| 6,477,579 B1 | 11/2002 | Kunkel et al. | |
| 6,498,791 B2 | 12/2002 | Pickett et al. | |
| 6,510,152 B1 | 1/2003 | Gerszberg et al. | |
| 6,526,581 B1 | 2/2003 | Edson | |
| 6,553,489 B1 | 4/2003 | Osler et al. | |
| 6,559,769 B2 | 5/2003 | Anthony et al. | |
| 6,560,222 B1 | 5/2003 | Pounds et al. | |
| 6,584,502 B1 | 6/2003 | Natarajan et al. | |

(Continued)

OTHER PUBLICATIONS

U.S. Appl. No. 10/654,861 Non-Final Office Action dated Mar. 28, 2007.

(Continued)

Primary Examiner—Phuoc H Nguyen
(74) Attorney, Agent, or Firm—Toler Law Group

(57) ABSTRACT

An enhanced network management system is disclosed. The network management system is configured to receive management information via multiple virtual connections from multiple data communication nodes. The management information includes service level information for a transparent connection, for example, a Digital Subscriber Line (DSL) connection carrying encapsulated frame relay packets between two networks, for example a wide area network and a local area network. The transparent connection is intermediate to the wide area network and the local area network. The management information further includes equipment failure information of customer equipment, for example, a bridging node used to encapsulate the frame relay packets. Thus, using the collected management information, a network outage caused by customer equipment failure can be differentiated from a service provider service level event.

26 Claims, 2 Drawing Sheets

U.S. PATENT DOCUMENTS

| | | |
|---|---|---|
| 6,594,695 B1 | 7/2003 | Vasamsetti et al. |
| 6,614,781 B1 | 9/2003 | Elliott et al. |
| 6,631,120 B1 | 10/2003 | Milbrandt |
| 6,631,436 B1 | 10/2003 | Liu et al. |
| 6,636,505 B1 | 10/2003 | Wang et al. |
| 6,947,416 B1 | 9/2005 | Nee et al. |
| 6,963,561 B1 | 11/2005 | Lahat |
| 6,970,924 B1 | 11/2005 | Chu et al. |
| 7,065,077 B1 | 6/2006 | Radhakrishnan et al. |
| 7,099,305 B1* | 8/2006 | Fardid ................. 370/352 |
| 7,184,427 B1 | 2/2007 | Carew et al. |
| 7,194,001 B2 | 3/2007 | Leatherbury et al. |
| 7,203,187 B1 | 4/2007 | Richardson et al. |
| 2002/0024964 A1* | 2/2002 | Baum et al. ............. 370/419 |
| 2002/0159462 A1 | 10/2002 | Demaria et al. |
| 2003/0039244 A1 | 2/2003 | Owens et al. |
| 2003/0043785 A1 | 3/2003 | Liu et al. |
| 2003/0076815 A1 | 4/2003 | Miller et al. |
| 2003/0108063 A1 | 6/2003 | Joseph et al. |
| 2003/0193959 A1 | 10/2003 | Lui et al. |
| 2004/0001579 A1 | 1/2004 | Feinberg et al. |
| 2004/0076166 A1 | 4/2004 | Patenaude |
| 2004/0111506 A1 | 6/2004 | Kundu et al. |
| 2004/0218584 A1 | 11/2004 | Brown |
| 2005/0053001 A1 | 3/2005 | Jones et al. |
| 2005/0089052 A1 | 4/2005 | Chen et al. |
| 2005/0226247 A1 | 10/2005 | Brown |
| 2006/0098670 A1* | 5/2006 | Voit et al. ............... 370/401 |
| 2007/0097884 A1* | 5/2007 | Chewning et al. .......... 370/254 |

OTHER PUBLICATIONS

U.S. Appl. No. 10/654,861 Response to Non-Final Office Action dated Mar. 28, 2007 (files Jun. 20, 2007).

U.S. Appl. No. 10/654,861 Final Office Action dated Sep. 19, 2007.

U.S. Appl. No. 10/654,861 Response to Final Office Action dated Sep. 19, 2007 (Dec. 5, 2007).

U.S. Appl. No. 10/654,861, Non-Final Office Action dated Mar. 18, 2008.

U.S. Appl. No. 10/654,861 Response to Non-Final Office Action dated Mar. 18, 2008 (filed Jun. 18, 2008).

U.S. Appl. No. 10/654,861 Notice of Allowance mailed Oct. 20, 2008.

* cited by examiner

ENHANCED NETWORK MANAGEMENT SYSTEM

CROSS-REFERENCE TO RELATED APPLICATION(S)

The present invention is related to subject matter that is disclosed in co-pending U.S. patent application Ser. No. 10/654,861, filed on the same day as the present patent application, entitled "ENHANCED CSU/DSU (CHANNEL SERVICE UNIT/DATA SERVICE UNIT) FOR FRAME RELAY OVER DSL," naming Kenneth Roger Jones and Brian A. Gonsalves as inventors, and incorporated herein by reference in its entirety.

BACKGROUND

1. Field of the Disclosure

The present disclosure relates generally to network management systems and methods of collecting management information data.

2. Description of the Related Art

Communication nodes located between wide area networks and local area data networks have been deployed commercially. An example of a communication node is a channel service unit/data service unit (CSU/DSU). CSU/DSU units that are currently available for deployment receive and forward data traffic between a wide area network and a local area network.

Network management systems typically rely on CSU/DSU units to monitor networks and equipment. Network management systems can be connected to a wide area network and may collect management reports from multiple CSU/DSU units via the wide area network. Network management systems use such collected information to administer service level agreements, monitor equipment, and the like. Some of the network equipment is owned and operated by customers and other equipment is owned and operated by a service provider, such as a telecommunications company. Customer billing can be based on a guaranteed minimum throughput and/or a local loop charge. For proper billing and to determine and allocate customer billing credits, network management system operators need information that differentiates between customer equipment faults and service provider outages.

CSU/DSU units are often connected directly to a wide area network via asynchronous transfer mode (ATM) equipment, but in some implementations the CSU/DSU unit may transfer frame relay communications to an intermediate network in the communication path to the wide area network. The intermediate network is typically transparent to the CSU/DSU unit. Depending on the connection to the wide area network, some CSU/DSU units are not capable of monitoring the intermediate connection used to transfer the data traffic. Lack of network management information is problematic when implementing service level agreements where customers are charged based on data bandwidth on the transparent connection.

Accordingly, there is a need for an enhanced method of accessing management data for transparent connections or networks.

BRIEF DESCRIPTION OF THE DRAWINGS

The use of the same reference symbols in different drawings indicates similar or identical items.

DESCRIPTION OF THE EMBODIMENT(S)

An enhanced network management system is disclosed. The network management system is configured to receive management information via multiple virtual connections from multiple data communication nodes. The management information includes service level information for a transparent connection, for example, a Digital Subscriber Line (DSL) connection carrying encapsulated frame relay packets between two networks, for example a wide area network and a local area network. The transparent connection is intermediate to the wide area network and the local area network. The management information further includes equipment failure information of customer equipment, for example, a bridging node used to encapsulate the frame relay packets. Thus, using the collected management information, a network outage caused by customer equipment failure can be differentiated from a service provider service level event.

Figure 1:
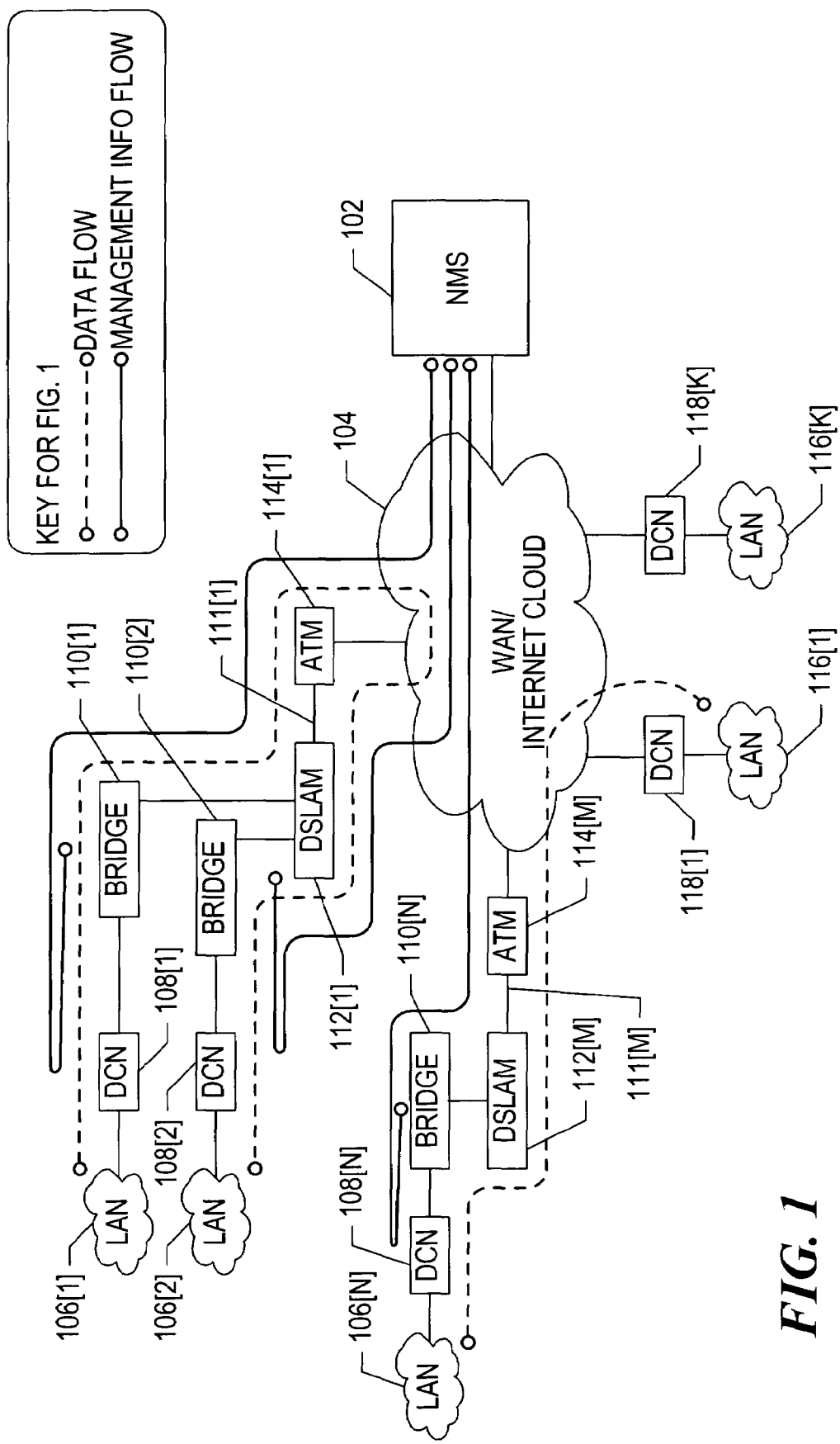
FIG. 1 is a general diagram that illustrates a network management system for a data network according to an embodiment of the present disclosure.

FIG. 1 is a general diagram that illustrates a network management system of a data network according to an embodiment of the present disclosure. A network management system 102 is connected to a wide area network 104. Multiple local area networks 106 are coupled to wide area network 104 through data communication nodes 108, bridges 110, digital subscriber line access multiplexers (DSLAMs) 112 and asynchronous transfer mode (ATM) devices 114. Other local area networks 116 are coupled to wide area network 104 via data communication nodes 118.

As illustrated, data traffic flows between local area networks via their connections to the wide area network. For example, data traffic from a first local area network 106 flows to a second local area network 106 via a first data communication node 108, a first bridge 110, a first DSLAM 112, a first ATM 114 through wide area network 104 and back through the first ATM 114, the first DSLAM 112, to a second bridge 110 and a second data communication node 108. Data communication nodes 108 communicate with wide area network 104 according to a frame relay type protocol. A frame relay type protocol is a packet-switching protocol for connecting devices on a wide area network. Transparent to the communication between the data communication nodes 108 and wide area network 104, corresponding bridges 110 transfer encapsulated data traffic to DSL connections 111 to DSLAM 112. The data traffic is encapsulated according to Frame Relay Over DSL protocol. Note that bridges 110 and DSLAM 112 encapsulate and de-capsulate the frame relay traffic and do not interpret or re-route the traffic. For example, a more direct communication path between the first local area network 106 and the second local area network 106 would not include the first ATM 114 and wide area network 104.

Wide area network 104 can be, for example, the Internet. Local area networks 106 can include, for example, a router and various peripheral equipment end terminals coupled via an Ethernet connection. Alternatively, local area network 106 can include a modem connected to a home user computer system.

Network management system 102 administers, among other things, service level agreements for DSL connections 111. Because equipment failures in customer owned bridges 110 could affect service levels on service provider owned DSL connections 111, network management system 102 must be capable of differentiating between service provider outages and equipment failures. As illustrated, management information flows from bridges 110 to corresponding data communication nodes 108 that monitor equipment fault information for bridges 110 and service level information for DSL connections 111. The management information then flows to network management system 102 via bridge 110, DSLAM 112, ATM equipment 114, and wide area network 104.

DSL connections 111 are high-speed digital connections. Each customer's traffic is bridged on to a separate Data Link Connection Identifier (DLCI). A DLCI is a private or switched virtual circuit in a Frame Relay network that indicates how the data is to be routed. By transferring traffic data using DSL connections 111, service costs are reduced and penetration is increased into certain markets that can be economically reached without the added expense of Frame Relay Switches in remote offices.

Data communication nodes 108 have management agents responsible for performing network management functions and can determine outage errors on DSL connections 111. The data nodes 108 can also differentiate between equipment failure of customer owned bridges 110 and service level or network failure of provider owned DSL connections 111. Data communication nodes 108 can monitor bridges 110 and DSL connections 111 utilizing a frame relay virtual circuit or connection (VC) or a DLCI. A VC is a two-way connection between the CSU/DSU 110 and bridging node 112 that communicates Simple Network Management Protocol (SNMP). SNMP is an Internet standard protocol, defined in RFC 1157, developed to manage nodes on an IP network.

Information gathered by data communication nodes 108 is sent to network management system 102 across wide area network 104 using another virtual circuit. Thus, bridges 110 send management information to data communication nodes 108 and the information is forwarded to network management system 102. The information can be sent in SNMP or Common Reliable Accounting for Network Element (CRANE) format, without additional processing. Network management system 102 formats collected information and performs calculations for performance measurements and bandwidth guarantees.

Figure 2:
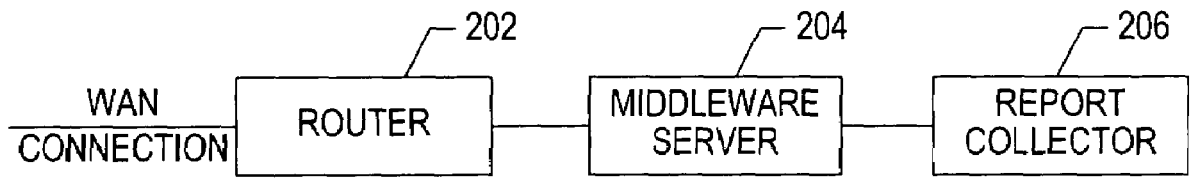
FIG. 2 is a block diagram of an embodiment of the network management system of FIG. 1.

FIG. 2 is a block diagram of an embodiment of the network management system 102. Network management system 102 includes a router 202 for connection to a wide area network, a middleware server 204 and a report collector 206. Middleware server 204 is a repository for management information collected from various data communication nodes. Report collector 206 can provide analysis of management information, provide notification of equipment failures, and provide administration of service level agreements for multiple customers.

Figure 3:
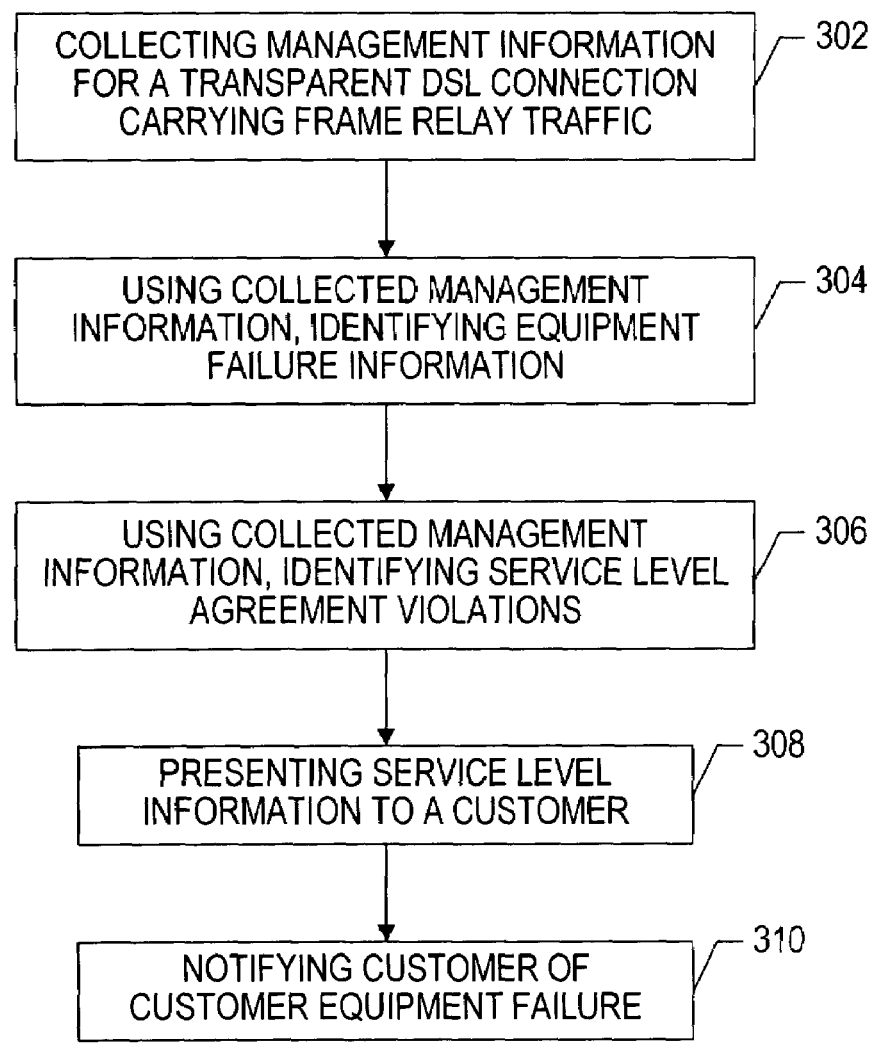
FIG. 3 is a flow chart that illustrates operation of the network management system of FIG. 1.

FIG. 3 is a flow chart that illustrates operation of the network management system 102. Management information is collected for a transparent connection, such as a DSL connection, carrying encapsulated data traffic, at step 302. The data traffic can be according to a frame relay protocol and the encapsulated data traffic can be according to a frame relay over DSL protocol. The transparent connection can be an intermediate network, for example, a DSL connection, between a local area network and a wide area network. Equipment failure information, such as failure of customer equipment, is identified using the collected management information, at step 304. Service level agreement violations, such as DSL bandwidth failures, may be identified using the collected management information, at step 306. Thus, using the collected management information, a network outage caused by customer equipment failure can be differentiated from a service provider service level event. Service level information can be presented to a customer, at step 308. Detected equipment failures can be presented to a customer, at step 310.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An enhanced network management system comprising:
a connection to a wide area network, the connection configured to receive management information via a plurality of virtual connections from a corresponding plurality of data communication nodes;
wherein each node is configured to monitor equipment fault information for customer owned equipment and service level information for provider owned connections;
wherein each data communication node couples a particular local area network to the wide area network;
wherein the management information transmitted from each of the plurality of data communication nodes includes service level information for a transparent connection between the local area network associated with the data communication node and the wide area network, the transparent connection being intermediate between the wide area network and the local area network, the transparent connection carrying encapsulated data traffic between the local area network and the wide area network, the management information further including equipment failure information for a bridging node configured to generate the encapsulated data traffic;
wherein the management information, when presented to a customer, allows the customer to differentiate between network outages caused by customer equipment failures and provider service events.

2. The network management system as recited in claim 1, wherein the transparent connection is a Digital Subscriber Line (DSL) connection that carries Frame Relay packets encapsulated according to a DSL protocol, and wherein the management information relates to encapsulated frame relay packets communicated between networks.

3. The network management system as recited in claim 1, wherein the management information is according to a Simple Network Management Protocol (SNMP).

4. The network management system as recited in claim 1, wherein the transparent connection is an intermediate network to the wide area network and a local area network.

5. The system of claim 1, wherein each virtual connection operates in accordance with one of a simple network management protocol (SNMP) or a common reliable accounting for network element (CRANE) format.

6. The system of claim 1, wherein the provider owned connections comprise a Digital Subscriber Line (DSL) connection carrying encapsulated frame relay packets between the wide area network and the local area network.

7. A network management system comprising:
a data network report collector for providing analysis of management information, providing notification of equipment failures, and providing administration of service level agreements for customers; and a data router having an interface coupled to a wide area network;

wherein data collected via the interface includes the management information regarding a service level for a plurality of provider owned transparent connections for carrying data traffic between a plurality of local area networks and the wide area network;

wherein the transparent connections are situated between the plurality of local area networks and the wide area network;

wherein the management information further includes equipment fault information for a bridging node configured to generate encapsulated data traffic; and wherein the management information, when presented to a customer, allows the customer to differentiate between network outages caused by customer equipment failures and provider service events.

8. The network management system as recited in claim 7, wherein the data traffic is communicated between the local area network and the wide area network according to a first protocol and the bridging node encapsulates the data traffic from the local area network according to a second protocol.

9. The network management system as recited in claim 8, wherein the first protocol is a frame relay type protocol and the second protocol is a Digital Subscriber Line (DSL) protocol.

10. The network management system as recited in claim 8, wherein a second node de-encapsulates the data traffic and transmits the data traffic to the wide area network.

11. The network management system as recited in claim 10, wherein the second node is a Digital Subscriber Line Access Multiplexer (DSLAM).

12. A method comprising:
collecting management information for a transparent connection carrying encapsulated data traffic, the management information further including equipment failure information for a bridging node configured to generate the encapsulated data traffic;
identifying the equipment failure information using the collected management information;
separately identifying service provider service level information using the collected management information; and
presenting the service level information and detected equipment failures to a customer to allow the customer to differentiate between network outages caused by customer equipment failures and provider service events.

13. The method as recited in claim 12, further comprising: providing notification of a detected equipment failure.

14. The method as recited in claim 12, wherein the transparent connection is an intermediate network between a local area network and a wide area network.

15. A network management system comprising:
a report collector for providing analysis of management information, providing notification of equipment failures, and providing administration of service level agreements for customers, wherein the management information includes
equipment failure information for a bridging node configured to generate encapsulated data traffic; and
a middleware server configured to collect management information from a plurality of data communication nodes for a transparent Digital Subscriber Line (DSL) connection between a wide area network and a plurality of local area networks, each local area network being associated with a corresponding data communication node, the management information being collected for the transparent Digital Subscriber Line via a Frame Relay network, the middleware server being further configured to forward the collected management information to the report collector, wherein, when presented to a customer, the collected management information allows the customer to differentiate between network outages caused by customer equipment failures and provider service events.

16. The network management system of claim 15, wherein the management information comprises customer equipment fault information and service level information of the transparent DSL connection.

17. The network management system of claim 16, wherein the customer equipment is a DSL bridge that encapsulates Frame Relay packets.

18. The network management system of claim 15, wherein the report collector is configured to display the management information to a user.

19. The network management system of claim 15, wherein the management information is used to differentiate between customer equipment failure and a service level agreement violation.

20. The network management system of claim 15, wherein frame relay packets are transparently encapsulated according to a DSL protocol and sent over the DSL connection.

21. The network management system of claim 15, further comprising:
a router coupled to the Frame Relay network and the middleware server.

22. A method comprising:
collecting management information from a plurality of data communication nodes for a transparent Digital Subscriber Line (DSL) connection between a wide area network and a plurality of local area networks, each local area network being associated with a corresponding Frame Relay data communication node, the DSL connection carrying encapsulated Frame Relay packets between the plurality of Frame Relay data communication nodes, wherein the management information includes equipment failure information for a bridging node configured to generate encapsulated data traffic;
differentiating between a network outage caused by customer equipment failure and a service provider service level event using the management information; and providing differentiated management information to a user.

23. The method of claim 22, wherein the management information comprises equipment fault information of a DSL bridge and service level information of the transparent DSL connection.

24. The method of claim 22, wherein the management information is collected via a Frame Relay network.

25. The method of claim 22, wherein the management information is collected via a virtual circuit from one of the Frame Relay data communication nodes, wherein the virtual circuit communicates according to a Frame Relay protocol.

26. The method of claim 22, wherein at least one of the data communication nodes is implemented as a channel service unit/data service unit.

* * * * *